United States Patent
Lei

(10) Patent No.: US 11,867,565 B2
(45) Date of Patent: Jan. 9, 2024

(54) DECOHERENCE PROCESSING METHOD AND SYSTEM, AND COHERENT LIGHT RECEIVING APPARATUS HAVING A PLURALITY OF PHOTOELECTRIC CONVERSION UNITS, PHASE DIFFERENCE DETECTION MODULES, PHASE COMPENSATION MODULES, AND A SIGNAL SUPERPOSITION AND OUTPUT MODULE

(71) Applicant: Ningbo ABAX Sensing Electronic Technology Co., Ltd., Ningbo (CN)

(72) Inventor: Shuyu Lei, Ningbo (CN)

(73) Assignee: Ningbo ABAX Sensing Electronic Technology Co., Ltd., Ningbo (CN)

( * ) Notice: Subject to any disclaimer, the term of this patent is extended or adjusted under 35 U.S.C. 154(b) by 156 days.

(21) Appl. No.: 17/630,196

(22) PCT Filed: Oct. 9, 2019

(86) PCT No.: PCT/CN2019/110222
§ 371 (c)(1),
(2) Date: Jan. 26, 2022

(87) PCT Pub. No.: WO2021/017163
PCT Pub. Date: Feb. 4, 2021

(65) Prior Publication Data
US 2022/0268636 A1    Aug. 25, 2022

(30) Foreign Application Priority Data
Aug. 1, 2019  (CN) .................. 201910705426.X

(51) Int. Cl.
*G01J 9/00* (2006.01)
(52) U.S. Cl.
CPC ..................... *G01J 9/00* (2013.01)

(58) Field of Classification Search
CPC ....... G01J 9/00; G01J 2009/002; G01S 7/486; G01S 7/4912; G01S 17/02; G01S 7/4861; G01S 7/4913
(Continued)

(56) References Cited

U.S. PATENT DOCUMENTS

| 2009/0284822 A1* | 11/2009 | Du | G01S 17/36 359/279 |
|---|---|---|---|
| 2019/0154835 A1 | 5/2019 | Maleki et al. | |

FOREIGN PATENT DOCUMENTS

| CN | 106501791 A | 3/2017 |
|---|---|---|
| CN | 108931782 A | 12/2018 |

(Continued)

OTHER PUBLICATIONS

International Search Report, China National Intellectual Property Administration, Application No. PCT/CN2019/110222, dated Apr. 26, 2020, 5 pages.

*Primary Examiner* — Que Tan Le
*Assistant Examiner* — Mai Thi Ngoc Tran
(74) *Attorney, Agent, or Firm* — Ziegler IP Law Group, LLC

(57) ABSTRACT

Disclosed are a decoherence processing method and system, and a coherent light receiving apparatus. The coherent light receiving apparatus comprises a plurality of photoelectric conversion units. The method comprises: performing phase comparison between electric signals, obtained by means of conversion performed by at least two of a plurality of photoelectric conversion units, and a reference signal to obtain a corresponding phase difference; according to the obtained phase difference, respectively performing phase compensation on the electric signals obtained by means of conversion performed by the at least two photoelectric conversion units, so as to obtain at least two compensated electric signals of the photoelectric conversion units; and (Continued)

using the at least two compensated electric signals of the photoelectric conversion units to superpose and output electric signals.

17 Claims, 10 Drawing Sheets

(58) Field of Classification Search
USPC .............................................. 250/214 R, 221
See application file for complete search history.

(56) References Cited

FOREIGN PATENT DOCUMENTS

| | | |
|---|---|---|
| CN | 109946707 A | 6/2019 |
| CN | 110068833 A | 7/2019 |
| CN | 109682321 B | 5/2020 |

* cited by examiner

DECOHERENCE PROCESSING METHOD AND SYSTEM, AND COHERENT LIGHT RECEIVING APPARATUS HAVING A PLURALITY OF PHOTOELECTRIC CONVERSION UNITS, PHASE DIFFERENCE DETECTION MODULES, PHASE COMPENSATION MODULES, AND A SIGNAL SUPERPOSITION AND OUTPUT MODULE

CROSS REFERENCE TO RELATED APPLICATION

The present application is the national phase of PCT International Application No. PCT/CN2019/110222, which claims priority to Chinese Patent Application No. CN201910705426.X, titled "DECOHERENCE PROCESSING METHOD AND SYSTEM, AND COHERENT LIGHT RECEIVING APPARATUS", filed on Aug. 1, 2019 with the Chinese Patent Office, both of which are incorporated herein by reference in their entireties.

FIELD

The present disclosure relates to the technical field of coherent detection, and in particular to a decoherence processing method, a decoherence processing system and a coherent light receiving device.

BACKGROUND

The coherent detection process is a process in which an echo signal and a local light are mixed, and a difference frequency component between the echo signal and the local light is outputted and is absorbed by a detector array to generate a photocurrent. The difference frequency component retains amplitude, frequency and phase information of the echo signal, so that the holographic detection of the echo signal can be achieved. Compared with a direct detection process, the coherent detection process has the advantages of high detection ability, high conversion gain, high signal-to-noise ratio and high anti-interference ability, and thus is widely used in coherent light communication, remote sensing, lidar speed measurement and ranging and other fields.

However, since signals received by a coherent light receiving device such as a coherent detector come from different parts of a target, the echo phases are different. Multiple echo signals interfere with the local light on the surface of the detector, and the detector array generates different phases of current signals when absorbing these interference signals, resulting in positive and negative cancellation when the signals are superimposed, and the total optical heterodyne signal is reduced. This phenomenon is called as the decoherence effect. Especially when the target surface is rough, the current phase on each pixel of the coherent detector array is randomly distributed due to the random fluctuation of the target surface. After the positive and negative cancellation, the outputted photocurrent is severely reduced and is difficult to be identified, affecting the detection effect.

In summary, it is desired to provide a decoherence processing solution to solve the above problems.

The above-mentioned information disclosed in the background section is only for enhancing the understanding of the background of the present disclosure, and may include information that does not constitute the conventional technology known to those skilled in the art.

SUMMARY

An object of the present disclosure is to provide a decoherence processing method, a decoherence processing system, and a coherent light receiving device, to overcome one or more problems caused by the limitations and defects of related technologies at least to a certain extent.

Other features and advantages of the present disclosure are apparent through the following detailed description, or partly learned through the practice of the present disclosure.

According to a first aspect of the present disclosure, a decoherence processing method is provided. The method is applied to a coherent light receiving device. The coherent light receiving device includes multiple photoelectric conversion units. The method includes:

comparing, for each of at least two of multiple photoelectric conversion units, a phase of an electrical signal converted by the photoelectric conversion unit with a phase of a reference signal to obtain a corresponding phase difference;

performing, for each of at least two of the multiple photoelectric conversion units, phase compensation on the electrical signal converted by the photoelectric conversion unit according to the obtained phase difference; and superimposing the at least two compensated electrical signals of photoelectric conversion units and outputting an electrical signal obtained by the superposition.

According to an exemplary embodiment of the present disclosure, the reference signal includes any one of the following:

a signal having a fixed phase value in a predetermined range;

one of electrical signals respectively converted by the multiple photoelectric conversion units, or an electrical signal outputted by superimposing at least two of the electrical signals respectively converted by the multiple photoelectric conversion units; and a total electrical signal outputted by performing phase compensation on at least two of the electrical signals respectively converted by the multiple photoelectric conversion units and superimposing the compensated electrical signals.

According to an exemplary embodiment of the present disclosure, the phase comparison, the phase compensation, and the superposition and output of corresponding electrical signals are performed for once or multiple times.

According to an exemplary embodiment of the present disclosure, in a case that the phase comparison, the phase compensation, and the superposition and output of corresponding electrical signals are performed for multiple times, the phase of the reference signal is compared with the phase of the electrical signal converted by each of at least two photoelectric conversion units in real time or at a predetermined timing.

According to an exemplary embodiment of the present disclosure, the total electrical signal outputted after each superposition or the total electrical signal outputted by superimposing the phase compensated electrical signals is used as the reference signal for a next phase comparison.

According to an exemplary embodiment of the present disclosure, the phase compensation is implemented by compensating the phase difference for once according to the obtained phase difference, or by performing phase compensation for multiple times.

According to an exemplary embodiment of the present disclosure, the process of compensating the phase difference includes:

determining the number of required compensation units based on the obtained phase difference between the photoelectric conversion unit and the reference signal, and a preset compensation value of each compensation unit; and conducting a corresponding number of compensation units according to the determined number of required compensation units, to compensate the electrical signal converted by the photoelectric conversion unit.

According to an exemplary embodiment of the present disclosure, the process of performing phase compensation for multiple times includes:

performing the phase compensation on the electrical signal outputted by the photoelectric conversion unit for multiple times with a preset compensation value, until a sum of the phase compensation is in a predetermined error range compared with the obtained phase difference; or performing preliminary rough compensation firstly with a first compensation value, and performing high precision compensation with a second compensation value, where the first compensation value is greater than the second compensation value.

According to an exemplary embodiment of the present disclosure, the photoelectric conversion unit includes at least one pixel.

According to a second aspect of the present disclosure, a decoherence processing system is provided. The system is applied to a coherent light receiving device. The coherent light receiving device includes multiple photoelectric conversion units. The system includes: N phase difference detection modules, N phase compensation modules respectively corresponding to the N phase difference detection modules, and a signal superposition and output module, where N is an integer greater than 1. Each of the photoelectric conversion units is configured to receive a light signal and converted the light signal into an electrical signal. Each of the phase difference detection modules is configured to compare an electrical signal converted by a photoelectric conversion unit connected to the phase difference detection module with a reference signal to obtain a phase difference. Each of the phase compensation modules is configured to compensate the electrical signal converted by the photoelectric conversion unit connected to the phase compensation module according to the phase difference. The signal superposition and output module is configured to superimpose electrical signals including N compensated electrical signals and output an electrical signal obtained by the superposition.

According to an exemplary embodiment of the present disclosure, the reference signal includes any one of the following:

a signal having a fixed phase value in a predetermined range;

one of electrical signals respectively converted by the multiple photoelectric conversion units, or a total electrical signal outputted by superimposing at least two of the electrical signals respectively converted by the multiple photoelectric conversion units; and a total electrical signal outputted by performing phase compensation on at least two of the electrical signals respectively converted by the multiple photoelectric conversion units and superimposing the compensated electrical signals.

According to an exemplary embodiment of the present disclosure, the phase of the reference signal is compared with the phase of the electrical signal converted by each of at least two photoelectric conversion units in real time or at a predetermined timing.

According to an exemplary embodiment of the present disclosure, the system further includes N waveform conversion units. Each of the waveform conversion units is provided between one of the photoelectric conversion units and one of the phase difference detection modules corresponding to the waveform conversion unit, and is configured to perform waveform conversion on an electrical signal converted by the photoelectric conversion unit for phase difference detection.

According to an exemplary embodiment of the present disclosure, the system further includes N filtering units. Each of the filtering units is provided between one of the waveform conversion units and one of the phase difference detection modules corresponding to the filtering unit, and is configured to convert an electrical signal outputted by the waveform conversion unit into a direct current signal and output the direct current signal to the corresponding phase difference detection module and the corresponding phase compensation module.

According to an exemplary embodiment of the present disclosure, the system further includes N first analog-to-digital conversion modules. Each of the first analog-to-digital conversion modules is provided between one of the photoelectric conversion units and one of the phase difference detection modules corresponding to the first analog-to-digital conversion module, and is configured to convert an electrical signal outputted by photoelectric conversion unit into a digital signal for phase difference detection.

According to an exemplary embodiment of the present disclosure, the phase difference detection module includes a phase discrimination unit, a phase difference voltage conversion unit and a second analog-to-digital conversion unit that are sequentially connected.

According to an exemplary embodiment of the present disclosure, the phase discrimination unit includes a first flip-flop, a second flip-flop and an AND gate.

According to an exemplary embodiment of the present disclosure, the phase difference voltage conversion unit includes a first current source, a first switch, a second switch, and a second current source that are sequentially connected.

According to an exemplary embodiment of the present disclosure, the phase compensation module includes multiple series-connected compensation units. Each of the compensation units is connected in parallel with a corresponding switch. The switch is turned on or turned off according to a signal outputted by the phase difference detection module.

According to an exemplary embodiment of the present disclosure, the photoelectric conversion unit includes at least one pixel.

According to a third aspect of the present disclosure, a coherent light receiving device is provided. The coherent light receiving device includes at least one decoherence processing system as described above.

According to some exemplary embodiments of the present disclosure, phases of different photoelectric conversion units/pixels are compensated to a same phase, and multiple electrical signals having the same phase are superimposed, thereby enhancing the signal intensity and eliminating the case that the electrical signal outputted after the superposition is weaker and thus is difficult to be identified, which is caused by the fact that positive and negative signals are canceled due to the different phases.

According to some exemplary embodiments of the present disclosure, in a case that the target detected by the coherent detector is a dynamic target, the phase comparison, the phase compensation, and the superposition and output of the corresponding electrical signals are performed for multiple times, to eliminate the effect of the speed change of the moving object on the phase of the electrical signal converted by the photoelectric conversion unit.

According to some exemplary embodiments of the present disclosure, the total electrical signal outputted each time is used as the reference signal for the next phase comparison, so that an overall phase deviation can be reduced and thus a response speed of phase compensation can be improved with the solution provided in the present disclosure, compared with the solution that the reference signal is set to have a certain fixed phase or a same phase as a certain photoelectric conversion unit.

It should be understood that the above general description and the following detailed description are only exemplary and cannot limit the present disclosure.

DETAILED DESCRIPTION OF EMBODIMENTS

Figure 1:
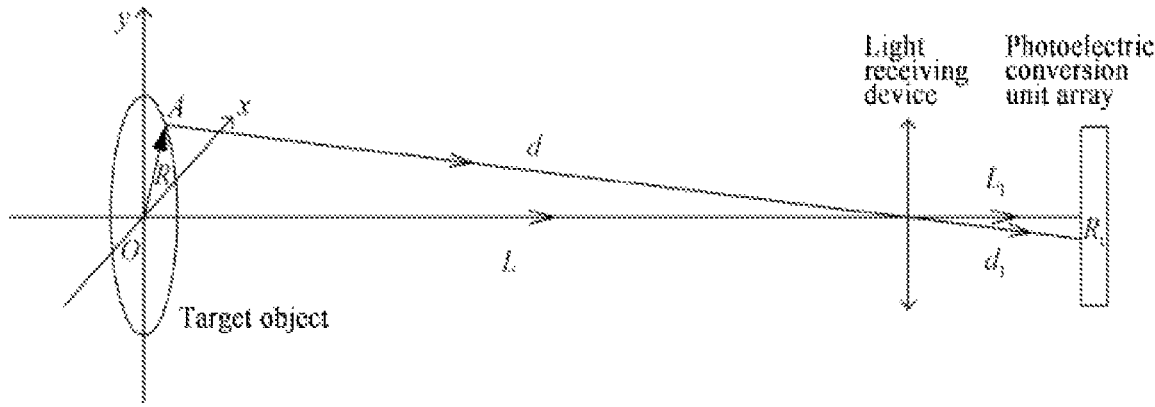
FIG. 1 shows a schematic diagram of an optical path system in a detection process of a coherent detector.

Exemplary embodiments are described more fully with reference to the drawings. The exemplary embodiments can be implemented in various forms and should not be construed as being limited to the examples set forth herein. These exemplary embodiments are provided so that the present disclosure is described more comprehensively and completely, and the concept of the exemplary embodiments is comprehensively conveyed to those skilled in the art. The drawings are only schematic illustrations of the present disclosure and are not necessarily drawn to scale. The same reference numerals in the drawings denote the same or similar parts, and thus repeated descriptions thereof are omitted.

In addition, the described features, structures, or characteristics may be combined in one or more exemplary embodiments in any suitable manner. In the following description, many specific details are provided to give a sufficient understanding of the exemplary embodiments of the present disclosure. However, those skilled in the art should understand that technical solutions of the present disclosure can be practiced without one or more of the specific details or with other methods, components or steps. In other cases, well-known structures, methods, implementations or operations are not shown or described in detail in order to avoid obscuring various aspects of the present disclosure.

Some of block diagrams shown in the drawings represent functional entities and do not necessarily correspond to physically or logically independent entities. These functional entities may be implemented in the form of software, or implemented in one or more hardware modules or integrated circuits, or implemented in different networks and/or processor devices and/or microcontroller devices.

An object of the present disclosure is to provide a decoherence processing method, a decoherence processing system and a coherent light receiving device. The decoherence processing method and the decoherence processing system are applied to the coherent light receiving device. The coherent light receiving device includes multiple photoelectric conversion units. The method includes: comparing a phase of an electrical signal converted by each photoelectric conversion unit with a phase of a reference signal to obtain a phase difference; performing, based on the obtained phase difference, phase compensation on the electrical signal converted by the photoelectric conversion unit; and superimposing multiple compensated electrical signals of the photoelectric conversion units and outputting a total electrical signal. With the decoherence processing method, the decoherence processing system and the coherent light receiving device provided in the present disclosure, phases of different photoelectric conversion units/pixels are compensated to a same phase, and multiple electrical signals having the same phase are superimposed, thereby enhancing the signal intensity and eliminating the case that the electrical signal outputted after the superposition is weaker and thus is difficult to be identified, which is caused by the fact that positive and negative signals are canceled due to the different phases. Further, in a case that the target detected by the coherent detector is a dynamic target, the phase comparison, the phase compensation, and the superposition and output of the corresponding electrical signals are performed for multiple times, to eliminate the effect of the speed change of the moving object on the phase of the electrical signal converted by the photoelectric conversion unit. Further, the total electrical signal outputted each time is used as the reference signal for the next phase comparison, so that an overall phase deviation can be reduced and thus a response speed of phase compensation can be improved with the solution provided in the present disclosure, compared with the solution that the reference signal is set to have a certain fixed phase or a same phase as a certain photoelectric conversion unit.

Figure 2:
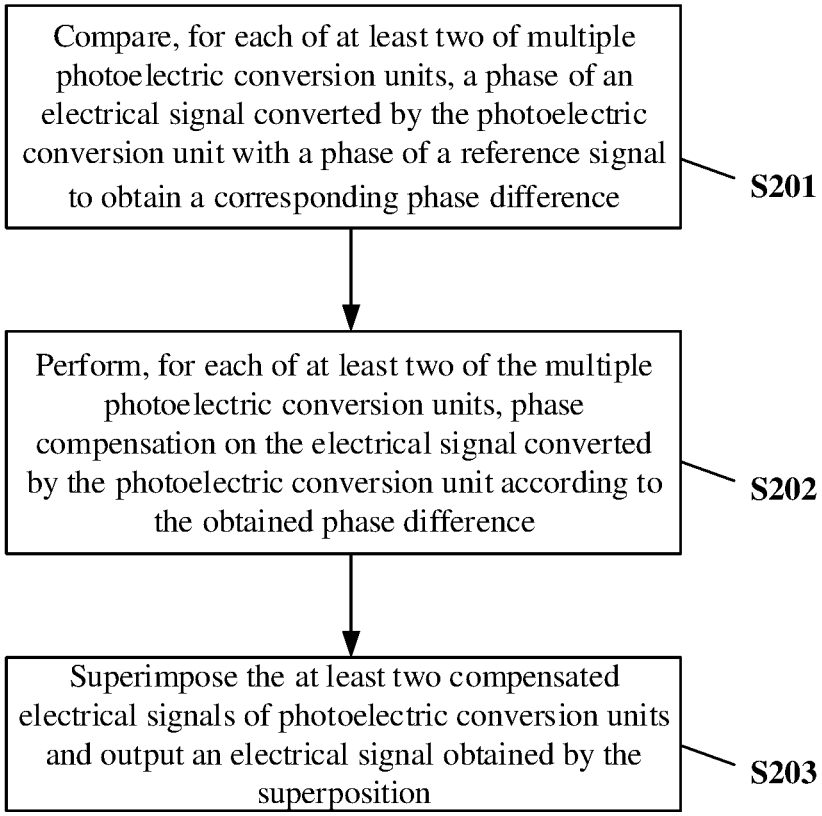
FIG. 2 shows a flowchart of a decoherence processing method according to an exemplary embodiment of the present disclosure.
Figure 3A:
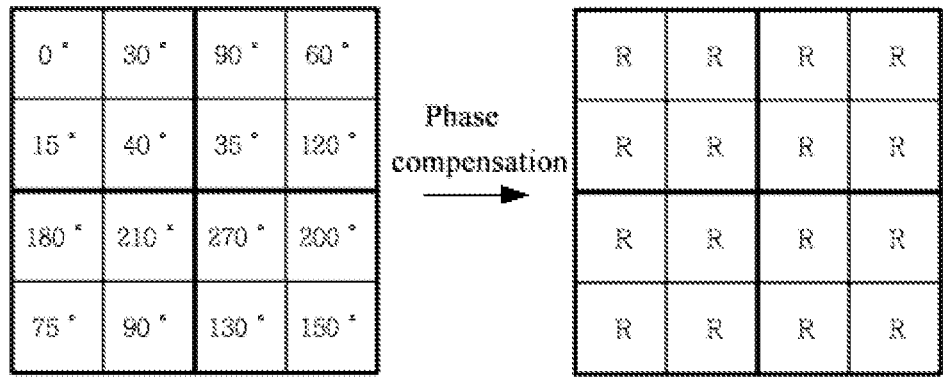
FIG. 3A is a schematic diagram showing that a same reference signal is provided in different regions of a photoelectric conversion unit array.
Figure 3B:
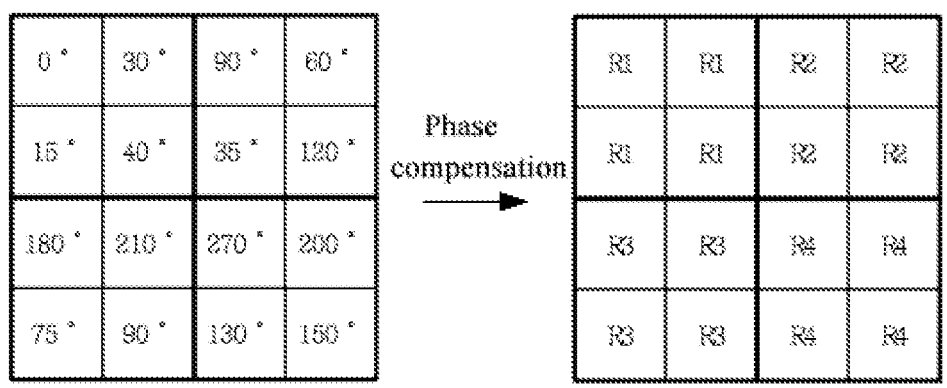
FIG. 3B is a schematic diagram showing that different reference signals are respectively provided in different regions of a photoelectric conversion unit array.
Figure 4:
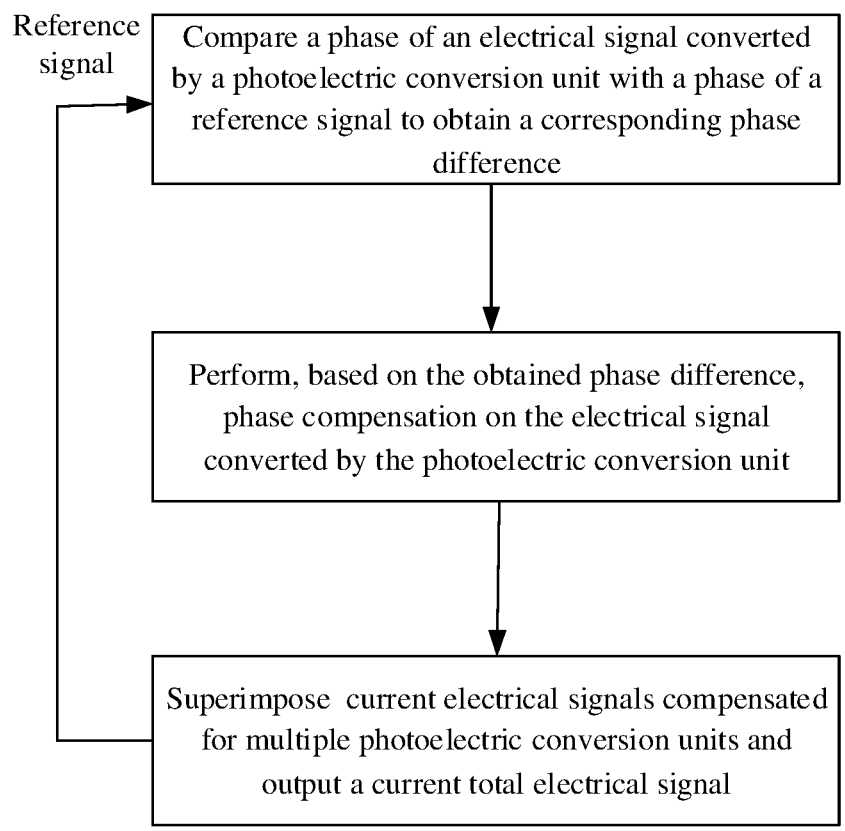
FIG. 4 shows a flowchart of a decoherence processing method in which a total electrical signal outputted each time serves as a reference signal for a next phase comparison.
Figure 5:
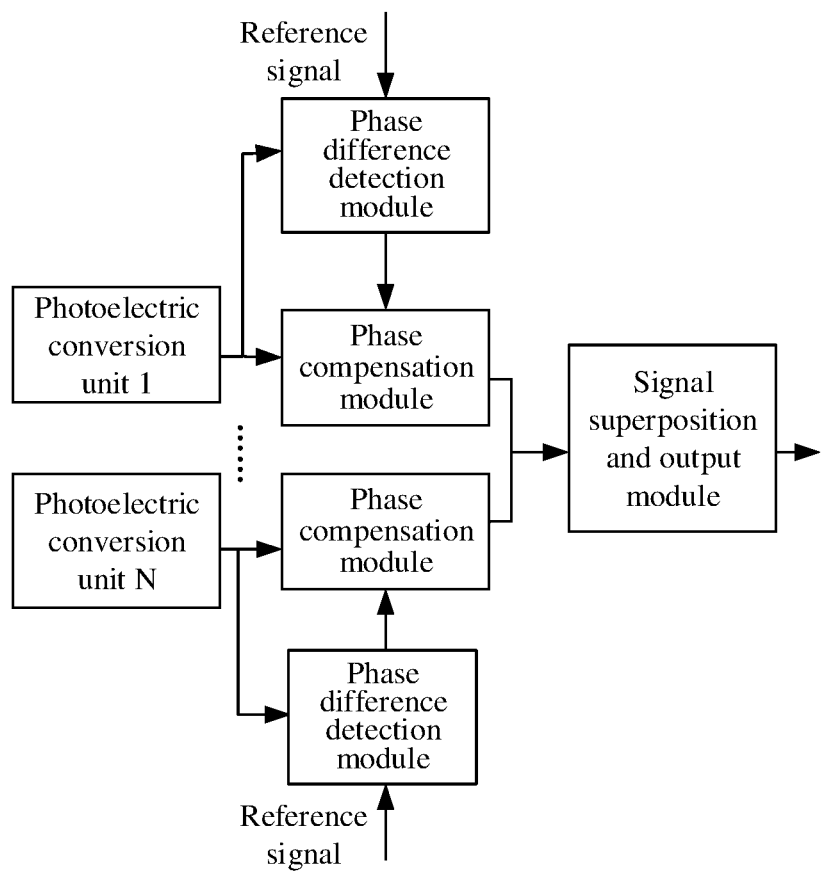
FIG. 5 shows a block diagram of a decoherence processing system according to an exemplary embodiment of the present disclosure.
Figure 6:
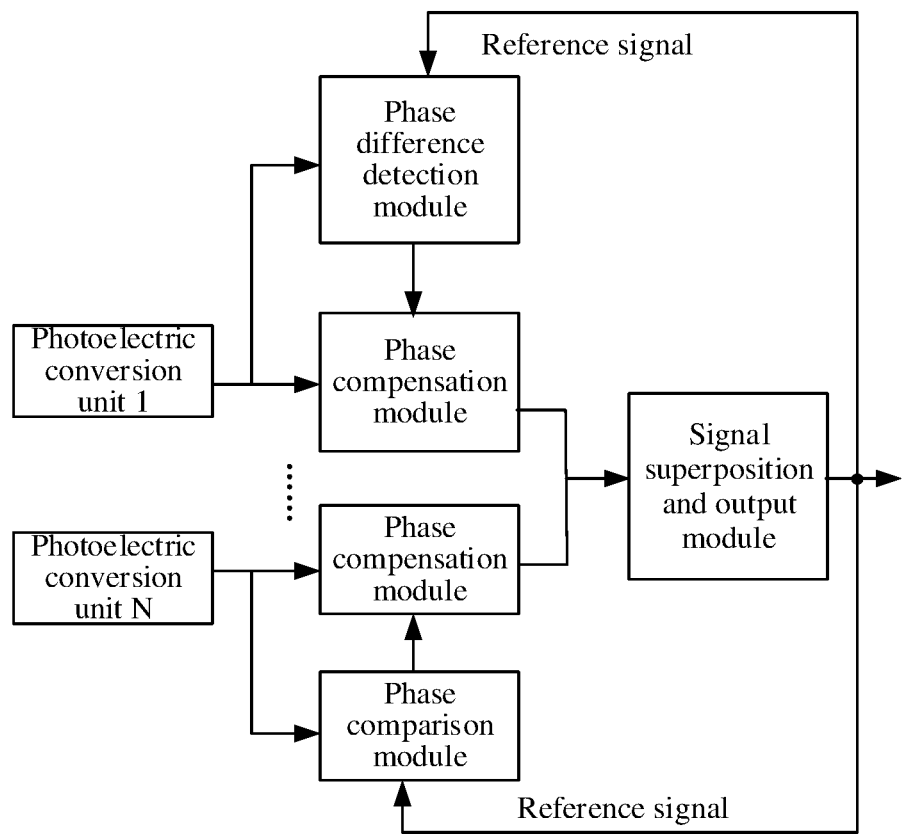
FIG. 6 shows a block diagram of a decoherence processing system in which a signal obtained by superposition is inputted as a reference signal for each phase difference detection module.
Figure 7:
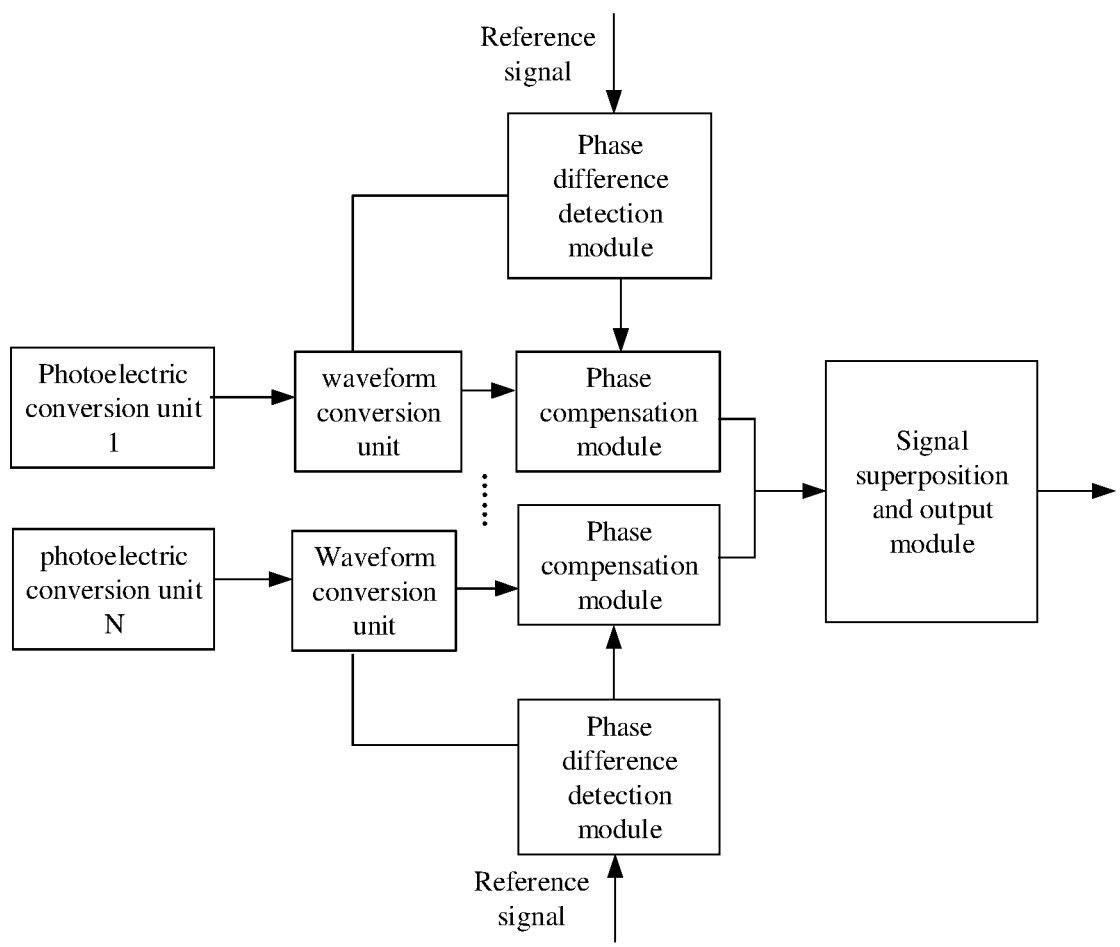
FIG. 7 shows a block diagram of a decoherence processing system in which a waveform conversion unit is added to an output end of a photoelectric conversion unit.
Figure 8:
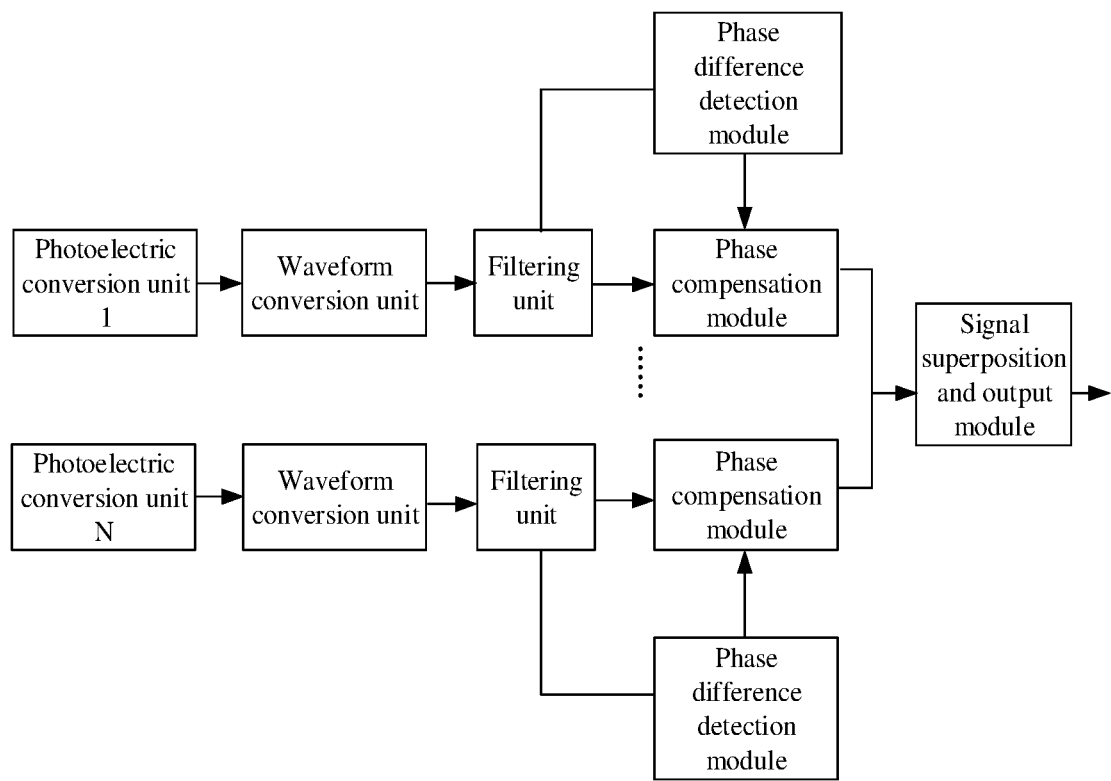
FIG. 8 shows a block diagram of a decoherence processing system in which a filtering unit is further added.
Figure 9:
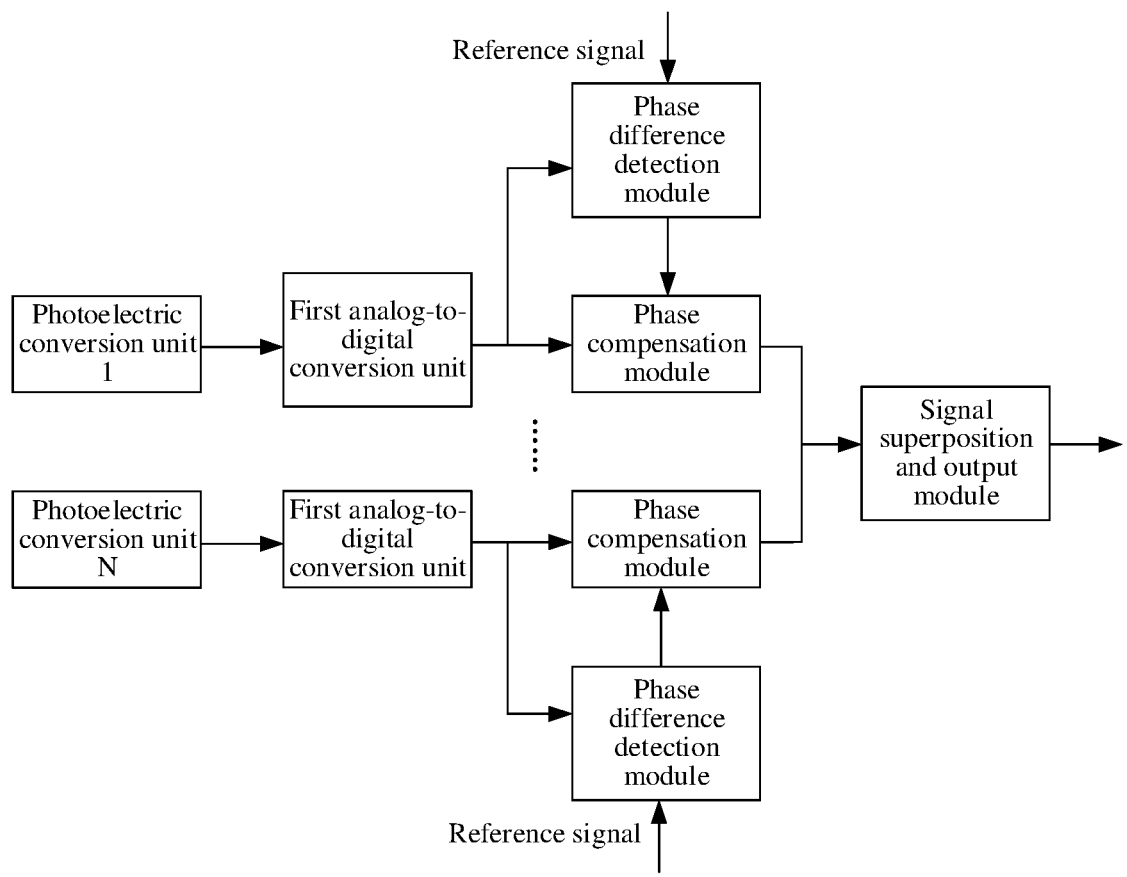
FIG. 9 shows a block diagram of a decoherence processing system in which a first analog-to-digital conversion module is added to the output end of the photoelectric conversion unit.
Figure 10:
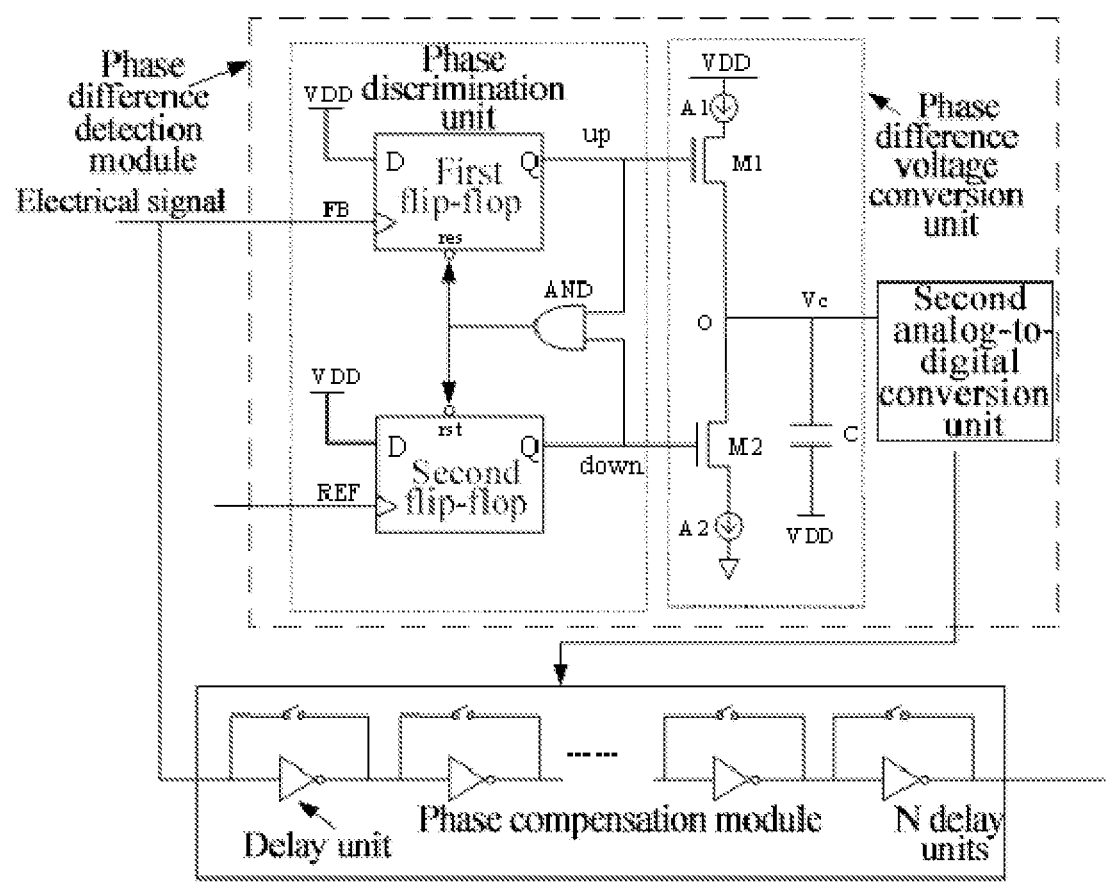
FIG. 10 is a circuit diagram schematically showing a phase difference detection module and a phase compensation module according to an embodiment of the present disclosure.
Figure 11:
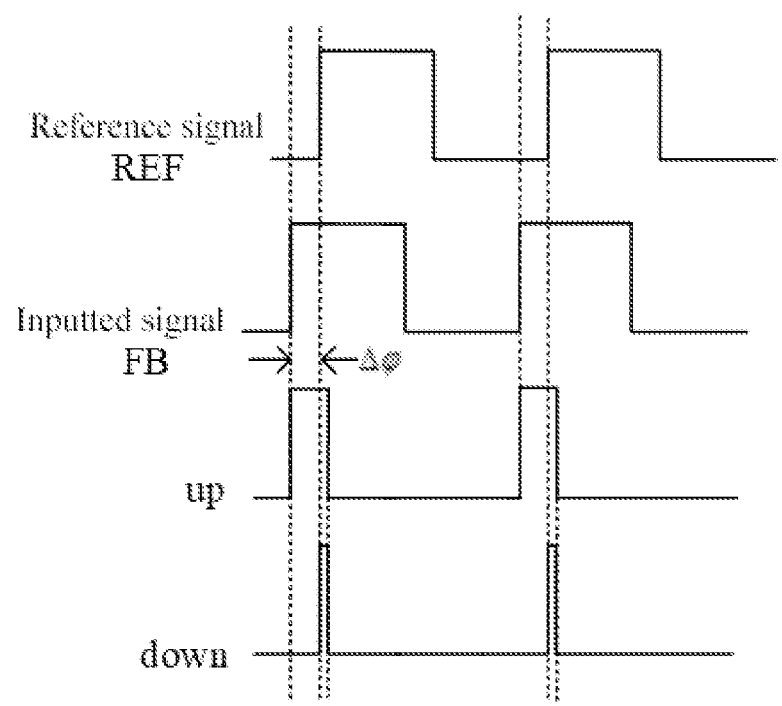
FIG. 11 shows a timing diagram of phase compensation.

The decoherence processing method, the decoherence processing system and the coherent light receiving device provided in the present disclosure are described in detail below in conjunction with FIG. 1 to FIG. 11, where FIG. 1 shows a schematic diagram of an optical path system in a detection process of a coherent detector, FIG. 2 shows a flowchart of a decoherence processing method according to an exemplary embodiment of the present disclosure, FIG. 3A is a schematic diagram showing that a same reference signal is provided in different regions of a photoelectric conversion unit array, FIG. 3B is a schematic diagram showing that different reference signals are respectively provided in different regions of a photoelectric conversion unit array, FIG. 4 shows a flowchart of a decoherence processing method in which a total electrical signal outputted each time serves as a reference signal for a next phase comparison, FIG. 5 shows a block diagram of a decoherence processing system according to an exemplary embodiment of the present disclosure, FIG. 6 shows a block diagram of a decoherence processing system in which a signal obtained by superposition is inputted and serves as a reference signal for each phase difference detection module, FIG. 7 shows a block diagram of a decoherence processing system in which a waveform conversion unit is added to an output end of a photoelectric conversion unit, FIG. 8 shows a block diagram of a decoherence processing system in which a filtering unit is further added, FIG. 9 shows a block diagram of a decoherence processing system in which a first analog-to-digital conversion module is added to the output end of the photoelectric conversion unit, FIG. 10 is a circuit diagram schematically showing a phase difference detection module and a phase compensation module according to an embodiment of the present disclosure, and FIG. 11 shows a timing diagram of phase compensation.

An optical path system in a detection process of a coherent light receiving device such as a coherent detector is described below as a whole by taking the coherent detector as an example.

FIG. 1 is a schematic diagram of an optical path system in a detection process of a coherent detector. A light reflected by a target object enters a photoelectric conversion unit array including multiple photoelectric conversion units after being coherent in an optical receiving system. The array converted the received coherence light into electrical signals.

A surface roughness of the target object, a detection distance and a movement speed of the target object all cause phases of the electrical signals to be changed, and a total electrical signal outputted after positive and negative cancellation is severely reduced. Therefore, a method and a system in which decoherence processing is performed through phase compensation are proposed in the present disclosure.

Hereinafter, a decoherence processing method according to an exemplary embodiment of the present disclosure is described in detail with reference to FIG. 2 to FIG. 4, where FIG. 2 shows a flowchart of a decoherence processing method according to an exemplary embodiment of the present disclosure, FIG. 3A is a schematic diagram showing that a same reference signal is provided in different regions of a photoelectric conversion unit array, FIG. 3B is a schematic diagram showing that different reference signals are respectively provided in different regions of a photoelectric conversion unit array, FIG. 4 shows a flowchart of a decoherence processing method in which a total electrical signal outputted each time serves as a reference signal for a next phase comparison. The decoherence processing method is applied to a coherent light receiving device. The coherent light receiving device includes multiple photoelectric conversion units, a detection surface of the coherent light receiving device may include an array formed by the multiple photoelectric conversion units, and the photoelectric conversion units each include at least one pixel (that is, including one or more pixels).

The decoherence processing method provided in the present disclosure includes: comparing a phase of an electrical signal converted by a photoelectric conversion unit with a phase of a reference signal to obtain a phase difference; performing phase compensation on the electrical signal converted by the photoelectric conversion unit according to the obtained phase difference; and performing electrical signal superposition and output by using the compensated electrical signal of the photoelectric conversion unit. Specifically, as shown in FIG. 2, the method is performed by performing the following steps S201 to S203.

In S201, for each of at least two of multiple photoelectric conversion units, a phase of an electrical signal converted by the photoelectric conversion unit is compared with a phase of a reference signal to obtain a corresponding phase difference.

According to an exemplary embodiment of the present disclosure, the reference signal may include any one of the following:

a signal having a fixed phase value in a predetermined range;

one of electrical signals respectively converted by the multiple photoelectric conversion units, or an electrical signal outputted by superimposing at least two of the electrical signals respectively converted by the multiple photoelectric conversion units; and a total electrical signal outputted by performing phase compensation on at least two of the electrical signals respectively converted by the multiple photoelectric conversion units and superimposing the compensated electrical signals.

According to an exemplary embodiment of the present disclosure, the array is divided into multiple regions, the same reference signal is used for photoelectric conversion units in the same region, and different reference signals are used for photoelectric conversion units respectively in different regions.

Specifically, the reference signal herein may be a signal having a fixed phase value in a predetermined range, or may be an output signal of a fixed object. The reference signal is described by the following implementations.

(1) The reference signal is any one fixed signal whose phase is in a range of 0° to 360°. For example, in a case that the phase of the reference signal is 0°, the phase of the electrical signal converted by the photoelectric conversion unit is compared with 0° to obtain a phase difference, and the compensation is performed based on the phase difference, to compensate the phase of the photoelectric conversion unit to 0°.

(2) The reference signal is an electrical signal outputted by any one photoelectric conversion unit in the photoelectric conversion unit array. Any one photoelectric conversion unit is selected from the photoelectric conversion unit array, and an electrical signal of the selected photoelectric conversion unit is determined as the reference signal. A phase difference between a photoelectric conversion unit and the electrical signal of the selected photoelectric conversion unit, and the compensation is performed based on the phase difference, to compensate a phase of the photoelectric conversion unit to the phase of the selected photoelectric conversion unit.

(3) The reference signal is an electrical signal outputted by superimposing at least two of electrical signals converted by the multiple photoelectric conversion units. That is, electrical signals converted by some or all of the photoelectric conversion units in the photoelectric conversion unit array are selected for the superposition of output electrical signals, and a total electrical signal outputted after the superposition is determined as the reference signal. A phase difference between a photoelectric conversion unit and the total electrical signal, and the compensation is performed based on the phase difference, to compensate a phase of the photoelectric conversion unit to the phase of the selected pixel.

(4) The reference signal is a total electrical signal outputted by performing phase compensation on at least two of the electrical signals respectively converted by the multiple photoelectric conversion units and superimposing the compensated electrical signals. That is, electrical signals converted by all of the photoelectric conversion units are selected and compensated respectively, and the compensated electrical signals are superimposed to output a total electrical signal as the reference signal. Further, electrical signals converted by some of the photoelectric conversion units are selected for compensation, and the compensated electrical signals and remaining uncompensated electrical signals converted by the photoelectric conversion units are superimposed to output a total electrical signal as the reference signal.

The multiple photoelectric conversion units herein may be all of photoelectric conversion units in the entire array as shown in FIG. 3A, or may be some of the photoelectric conversion units, where R represents a phase of the reference signal.

If the multiple photoelectric conversion units are formed by some of the above photoelectric conversion units, the photoelectric conversion units in the entire array may be divided into multiple regions. Different regions may be provided with the same reference signal as shown in FIG. 3A, or may be provided with different reference signals as shown in FIG. 3B, where the regions may have different sizes, and R1, R2, R3, and R4 respectively represent different phase values.

The electrical signal converted by the photoelectric conversion unit herein includes at least one of a current signal, a voltage signal, and a digital signal obtained by conversion of the current or voltage signal.

The electrical signal converted by the photoelectric conversion unit may be a difference between electrical signals generated by the photoelectric conversion unit in different states, for example, a difference between an electrical signal generated by an echo and a background light that are received by the photoelectric conversion unit and an electrical signal generated by the received background light. In this way, the interference of the background light can be eliminated, and the signal-to-noise ratio can be improved.

A waveform of the electrical signal is not limited herein. For example, the waveform may include any one of a sine wave, a square wave, a triangle wave, and a sawtooth wave.

The phase comparison between the electrical signal converted by the photoelectric conversion unit and the reference signal may be implemented by a phase discriminator or in any phase comparison method in the conventional technology. For a non-square wave signal, in order to facilitate obtaining the phase difference, the non-square wave signal may be converted into a square wave signal, and the square wave signal is compared with the reference signal. Further, the obtained square wave signal may be further filtered to obtain a direct current signal, and the direct current signal is compared with the reference signal.

In S202, for each of at least two of the multiple photoelectric conversion units, phase compensation is performed on the electrical signal converted by the photoelectric conversion unit based on the obtained phase difference, to obtain at least two compensated electrical signals of photoelectric conversion units.

According to an exemplary embodiment of the present disclosure, the phase compensation is implemented by compensating the phase difference for once according to the obtained phase difference, or by performing phase compensation for multiple times.

According to an exemplary embodiment of the present disclosure, the process of compensating the phase difference for once according to the obtained phase difference includes: determining the number of required compensation units based on the obtained phase difference between the photoelectric conversion unit and the reference signal, and a preset compensation value of each compensation unit; and conducting a corresponding number of compensation units according to the determined number of required compensation units, to compensate the electrical signal converted by the photoelectric conversion unit.

According to an exemplary embodiment of the present disclosure, the process of performing phase compensation for multiple times includes:

performing the phase compensation on the electrical signal outputted by the photoelectric conversion unit for multiple times with a preset compensation value, until a sum of the phase compensation is in a predetermined error range compared with the obtained phase difference; or performing preliminary rough compensation firstly with a first compensation value, and performing high precision compensation with a second compensation value, where the first compensation value is greater than the second compensation value.

In other words, the phase difference may be compensated for once according to the obtained phase difference, or a quantitative phase compensation may be performed for multiple times to finally obtain required phase difference compensation.

For the method in which the phase difference compensation is performed for once, a phase compensation module determines the required phase compensation unit according to the obtained phase difference signal, and directly compensates the phase difference for the input electrical signal.

For the method in which the quantitative phase compensation is performed for multiple times, the phase compensation is performed on the electrical signal outputted by the photoelectric conversion unit for multiple times with the preset compensation value, until the sum of the phase compensation is equal to the inputted phase difference or is most closely to the inputted phase difference in the allowable error range. The following description is given by taking the preset compensation value of 2° as an example. In a case that the phase difference is 10°, the compensation is required to be performed for five times to reach the phase difference.

Due to the effect of the movement of the detected object, the phase of the electrical signal converted by the photoelectric conversion unit is dynamically changed, so that the phase compensation range has a certain span, and the phase difference between the electrical signal and the reference signal sometimes changes in a relative large range. The preset compensation value may be set hierarchically, and may be selected or combined according to the magnitude of the phase difference. Taking the two-level setting as an example, the preset compensation value of the first compensation unit is set to 1°, and the preset compensation value of the second compensation unit is set to 3°. The first compensation unit may be used for the compensation in a case that the phase difference is relative small, and the second compensation unit is used for compensation in a case that the phase difference is relative large. Further, in the case that the phase difference is relative large, the second compensation unit is used for preliminary rough compensation, and then the second compensation unit is used for high-precision compensation.

For an analog signal, the phase compensation may be realized by means of delay. Further, the analog signal may be converted into a digital signal, and the phase compensation is performed through an IODELAY module (an input and output delay module) and an IODELAYCTRL module in an FPGA array, or through a shift register.

In S203, the at least two compensated electrical signals of the photoelectric conversion units are superimposed for output.

It should be noted that, in the case that the phase compensation is performed on the electrical signals converted by all of the photoelectric conversion units, all the compensated electrical signals are superimposed, and an electrical signal obtained by the superposition is outputted as the total electrical signal. In addition, in a case that the phase compensation is performed only on the electrical signals converted by some of the photoelectric conversion units, these compensated electrical signals are superimposed and an electrical signal obtained by the superposition is outputted as the total electrical signal, or these compensated electrical signals and remaining uncompensated electrical signals converted by the photoelectric conversion units are superimposed and the superimposed electrical signal is outputted as the total electrical signal.

Depending on an actual detection target/detection environment, or the like, the phase comparison, the phase compensation, and the superposition and output of corresponding electrical signals may be performed for once or multiple times, which is described in detail below.

According to an exemplary embodiment of the present disclosure, the phase comparison, the phase compensation, and the superposition and output of corresponding electrical signals may be performed for once or multiple times.

For example, according to an exemplary embodiment of the present disclosure, in a case that the target detected by the coherent detector is a stationary target, the phase comparison, the phase compensation, and the superposition and output of corresponding electrical signals is performed for once.

According to an exemplary embodiment of the present disclosure, in a case that the phase comparison, the phase compensation, and the superposition and output of corresponding electrical signals are performed for multiple times, the phase of the reference signal is compared with the phase of the electrical signal converted by each of the multiple photoelectric conversion units in real time or at a predetermined timing.

For example, according to an exemplary embodiment of the present disclosure, in a case that the target detected by the coherent detector is a dynamic target, the phase comparison, the phase compensation, and the superposition and output of corresponding electrical signals is performed for multiple times.

For the moving object/target, the speed change may cause a dynamic change of the phase of the electrical signal converted by the photoelectric conversion unit. In this case, the dynamically changed phase is required to be dynamically compensated, which is implemented by the following processes. The phase of the electrical signal converted by the photoelectric conversion unit is compared with the phase of the reference signal to obtain a corresponding phase difference. Next, according to the currently obtained phase difference, the phase compensation is performed on the electrical signal converted by the photoelectric conversion unit. Multiple currently compensated electrical signal of the photoelectric conversion units are superimposed to output a current total electrical signal.

According to an exemplary embodiment of the present disclosure, the phase comparison, the phase compensation, and the superposition and output of corresponding electrical signals are performed for multiple times at a predetermined timing/predetermined time interval.

According to an exemplary embodiment of the present disclosure, every time a reference signal is inputted, the phase comparison, the phase compensation, and the superposition and output of corresponding electrical signals are performed for once.

In other words, the above phase comparison is performed by comparing the phase of the electrical signal converted by the photoelectric conversion unit with the phase of the reference signal at the predetermined timing/predetermined time interval. Further, the above phase comparison may also be performed in real time based on the input of the reference signal, to obtain the corresponding phase difference. That is, every time a reference signal is inputted, the phase comparison is performed in real time.

According to an exemplary embodiment of the present disclosure, the total electrical signal outputted after each superposition or the total electrical signal outputted by superimposing the phase compensated electrical signals is used as the reference signal for a next phase comparison. As shown in FIG. 4, when the total electrical signal is inputted, the phase comparison is performed to obtain a current phase difference. The phase compensation is performed on the electrical signal converted by the photoelectric conversion unit based on the current phase difference. The compensated electrical signal is used for superposition to output a current total electrical signal. The current total electrical signal is inputted as a reference signal for a next cycle/next phase comparison, to obtain a phase difference in the next cycle/next phase comparison.

According to an exemplary embodiment of the present disclosure, the photoelectric conversion unit includes at least one pixel, that is, each photoelectric conversion unit may include one pixel or multiple pixels.

The decoherence processing system provided in the present disclosure is specifically described below with reference to FIG. 5 to FIG. 11. The decoherence processing system is applied to a coherent light receiving device. FIG. 5 shows a block diagram of a decoherence processing system according to an exemplary embodiment of the present disclosure, FIG. 6 shows a block diagram of a decoherence processing system in which a signal obtained by superposition is inputted and serves as a reference signal for each phase difference detection module, FIG. 7 shows a block diagram of a decoherence processing system in which a waveform conversion unit is added to an output end of a photoelectric conversion unit, FIG. 8 shows a block diagram of a decoherence processing system in which a filtering unit is further added, FIG. 9 shows a block diagram of a decoherence processing system in which a first analog-to-digital conversion module is added to the output end of the photoelectric conversion unit, FIG. 10 is a circuit diagram schematically showing a phase difference detection module and a phase compensation module according to an embodiment of the present disclosure, and FIG. 11 shows a timing diagram of phase compensation.

As shown in FIG. 5, a decoherence processing system applied to a coherent light receiving devices such as a coherent detector includes: N phase difference detection modules, N phase compensation modules respectively corresponding to the N phase difference detection modules, and a signal superimposition and output module, where N is an integer greater than 1.

The photoelectric conversion unit is configured to receive a light signal and convert the light signal into an electrical signal. Each phase difference detection module is configured to compare an electrical signal converted by the photoelectric conversion unit connected to the phase difference detection module with a reference signal to obtain a phase difference. Each phase compensation module is configured to compensate the electrical signal converted by the photoelectric conversion unit connected to the phase compensation module according to the phase difference. The superposition and output module is configured to superimpose electrical signals including N compensated electrical signals and output an electrical signal obtained by the superposition.

Specifically, an output terminal of the photoelectric conversion unit may be connected to a first input terminal of the phase difference detection module and a first input terminal of the phase compensation module. A second input terminal of the phase difference detection module is provided to receive the reference signal. An output terminal of the phase difference detection module is connected with a second input terminal of the phase compensation module. An output terminal of the phase compensation module is connected with the signal superposition and output module.

The electrical signal converted by the photoelectric conversion unit based on the received light enters the phase difference detection module and is compared with the reference signal to obtain the phase difference. The phase compensation module compensates the electrical signal inputted by the photoelectric conversion unit according to the received phase difference. The compensated electrical signal is inputted into the signal superposition and output module and is superimposed with a compensated electrical signal of another photoelectric conversion unit for output.

According to an exemplary embodiment of the present disclosure, a detection surface of the coherent detector is provided with an array including N photoelectric conversion units. Each photoelectric conversion unit includes at least one pixel (that is, each photoelectric conversion unit may include one pixel or multiple pixels). The array may be divided into multiple regions. The same reference signal is used for photoelectric conversion units in the same region, and different reference signals are used for photoelectric conversion units respectively in different regions. That is, the photoelectric conversion unit may be formed by one pixel or multiple pixels, and different photoelectric conversion units may be divided into different regions. The photoelectric conversion units in the same region have the same reference signal, and the reference signals respectively in the different regions may be the same or different.

With the above solution, phases of different photoelectric conversion units are compensated to a same phase, and multiple electrical signals having the same phase are superimposed, thereby enhancing the signal intensity and eliminating the case that the electrical signal outputted after the superposition is weaker and thus is difficult to be identified, which is caused by the fact that positive and negative signals are canceled due to the different phases.

The phase difference detection module may include at least one of a phase discriminator and any phase comparison device in the conventional technology. The phase discriminator includes any one of a sine wave phase discriminator, a square wave phase discriminator, a triangle wave phase discriminator and a sawtooth wave phase discriminator.

According to an exemplary embodiment of the present disclosure, the reference signal may include any of the following:

a signal having a fixed phase value in a predetermined range;

one of electrical signals respectively converted by the multiple photoelectric conversion units, or a total electrical signal outputted by superimposing at least two of the electrical signals respectively converted by the multiple photoelectric conversion units; and a total electrical signal outputted by performing phase compensation on at least two of the electrical signals respectively converted by the multiple photoelectric conversion units and superimposing the compensated electrical signals.

According to an exemplary embodiment of the present disclosure, the phase of the reference signal is compared with the phase of the electrical signal converted by each of at least two photoelectric conversion units in real time or at a predetermined timing.

Specifically, based on the embodiment shown in FIG. 5, an output terminal of the signal superposition and output module is connected to second input terminals of the phase difference detection modules, as shown in FIG. 6, to input the signal obtained by the superposition as the reference signal to each phase difference detection module.

With the above method, the electrical signal obtained by the superposition is fed back to the phase compensation module in real time or according to a predetermined period. Since the phase of the signal obtained by the superposition reflects an overall trend of multiple electrical signals, an overall phase deviation can be reduced and thus a response speed of phase compensation can be improved with this solution, compared with the solution that the reference signal is set to have a certain fixed phase or a same phase as a certain photoelectric conversion unit.

According to an exemplary embodiment of the present disclosure, the system further includes N waveform conversion units. Each waveform conversion unit is configured to convert the electrical signal outputted by the corresponding photoelectric conversion unit into any one of a square wave, a triangle wave, and a sawtooth wave. As shown in FIG. 7, a waveform conversion unit is added at an output terminal of the photoelectric conversion unit. An output terminal of the waveform conversion unit is connected to the first input terminal of the phase difference detection module and the first input terminal of the phase compensation module. The waveform conversion unit is configured to convert the electrical signal outputted by the photoelectric conversion unit into any one of square wave, triangle wave and sawtooth wave, for the phase difference detection and the phase compensation.

Further, according to an exemplary embodiment of the present disclosure as shown in FIG. 8, the decoherence processing system may further include N filtering units. Each filter unit is configured to convert the electrical signal outputted by the corresponding waveform conversion unit into a direct current signal and output the direct current signal to the corresponding phase difference detection module and the corresponding phase compensation module. As shown in FIG. 8, the filtering units may further be added in the decoherence processing system. An input terminal of the filtering unit is connected to an output terminal of the waveform conversion unit, and an output terminal of the filtering unit is connected to the first input terminal of the phase difference detection module and the first input terminal of the phase compensation module. The electrical signal outputted by the photoelectric conversion unit is converted by the waveform conversion unit and is further converted into the direct current signal by the filtering unit, and then is compared with the reference signal to perform the phase comparison and phase compensation.

According to an exemplary embodiment of the present disclosure, the system further includes N first analog-to-digital conversion modules each configured to convert the electrical signals outputted by the corresponding photoelectric conversion unit into a digital signal. As shown in FIG. 9, the output terminal of the photoelectric conversion unit is connected to the first analog-to-digital conversion module to convert an analog signal into a digital signal. In this embodiment, the phase difference detection module, the phase compensation module, and the signal superposition and output module all process the digital signal. With this embodiment, accurate compensation can be achieved by making full use of the advantages of the digital signal having high processing accuracy and strong anti-interference ability, and the intensity of the output signal can be improved.

According to an exemplary embodiment of the present disclosure, the phase difference detection module includes a phase discrimination unit, a phase difference voltage conversion unit, and a second analog-to-digital conversion unit that are sequentially connected.

According to an exemplary embodiment of the present disclosure, the phase discrimination unit includes a first flip-flop, a second flip-flop and an AND gate.

According to an exemplary embodiment of the present disclosure, the phase difference voltage conversion unit includes a first current source, a first switch, a second switch, and a second current source that are sequentially connected.

FIG. 10 is a circuit diagram schematically showing a phase difference detection module and a phase compensation module according to an embodiment of the present disclosure. The phase difference detection module includes a phase discrimination unit, a phase difference voltage conversion unit and a second analog-to-digital conversion unit that are sequentially connected. The phase discrimination unit is configured to acquire the phase difference between the inputted electrical signal and the reference signal. The phase difference voltage conversion unit is configured to convert the phase difference into a voltage Vc for output. The second analog-to-digital conversion unit is configured to convert the inputted voltage Vc into a signal indicting the number of required compensation units and output the signal to the phase compensation module. The compensation unit may perform the compensation by a phase delay and shift method. That is, a delay unit formed by a delayer is used as the compensation unit. The phase discrimination unit is provided with a first input terminal for receiving an electrical signal FB and a second input terminal for receiving a reference signal REF. The electrical signal PB and the reference signal REF are processed by the phase discrimination unit so that the phase discrimination unit outputs an up signal and a down signal respectively to two input terminals of the phase difference voltage conversion unit. The phase difference voltage conversion unit outputs the voltage Vc to the second analog-to-digital conversion unit according to a phase difference between the inputted up signal and the inputted down signal. The second analog-to-digital conversion unit converts the voltage Vc into a digital signal and outputs the digital signal to the phase compensation module. The phase compensation module determines the number of phase delay units required for the phase difference to be compensated according to the inputted digital signal. The electrical signal inputted to the phase compensation module is processed by a corresponding number of delay units and then is outputted. In this way, the phase compensation is completed.

The phase discrimination unit includes a first flip-flop, a second flip-flop and an AND gate. A first input terminal of the first flip-flop serves as a D input terminal and is connected to the power supply, a second input terminal of the first flip-flop is used to receive the electrical signal, and a third input terminal of the first flip-flop is connected with an output terminal of the AND gate and is used to reset based on an output signal of the AND gate. In a case that the electrical signal is in a rising edge, the output terminal Q=D is used to output the up signal in response to the rising edge of the electrical signal. The up signal is inputted to a first input terminal of the phase difference voltage conversion unit and a first input terminal of the AND gate. A first input terminal of the second flip-flop serves as a D input terminal and is connected to a power supply, a second input terminal of the second flip-flop is used to receive the reference signal, and a third input terminal of the second flip-flop is connected with the output terminal of the AND gate and is used to reset based on the output signal of the AND gate. An output terminal of the second flip-flop is used to output the down signal in response to a rising edge of the reference signal. The down signal is inputted to a second input terminal of the phase difference voltage conversion unit and a second input terminal of the AND gate. The output terminal of the AND gate is connected to the third input terminal of the first flip-flop and the third input terminal of the second flip-flop, to respectively reset the up signal and the down signal.

The phase difference voltage conversion unit includes a first current source A1, a first switch M1, a second switch M2, and a second current source A2 that are sequentially connected. An input terminal of the first current source A1 is connected to the power supply. An output terminal of the second current source is grounded. A common terminal O of the first switch M1 and the second switch M2 is connected to one terminal of a capacitor C and the second analog-to-digital conversion uni. The other end of the capacitor C is connected to the power supply.

The second analog-to-digital conversion unit is configured to convert the inputted voltage Vc into a signal indicating the number of required delay units and output the signal to the phase compensation module.

According to an exemplary embodiment of the present disclosure, the phase compensation module includes multiple series-connected delay units (/compensation units, as described above, a delay unit formed by a delayer is used as a compensation unit, the same below). Each delay unit is connected in parallel with a corresponding switch. The switch is turned on or turned off according to the signal outputted by the phase difference detection module. As shown in FIG. 10, the phase compensation module includes N series-connected delay units, and each delay unit is connected in parallel with a corresponding switch. The switch is turned on or turned off according to the signal outputted by the second analog-to-digital conversion unit of the phase difference detection module. The delay unit with the switch turned off is used to delay the inputted electrical signal. The delay unit with the switch turned on is equivalent to a short circuit, and there is no delay when the electrical signal passes.

The principle is explained in conjunction with FIG. 11. When the electrical signal PB is inputted, the rising edge thereof triggers the generation of the up signal. When the reference signal REF is inputted, the rising edge thereof triggers the generation of the down signal. When both the up signal and the down signal are at a high level, the reset signal is outputted by the AND gate to change the up signal and the down signal from the high level to a low level. Therefore, the phase difference between the rising edges of the two signals is the phase difference between the electrical signal and the reference signal.

When the up signal is at a high level, the first switch M1 of the phase difference voltage conversion unit is turned on, and the capacitor C is charged through the current source A1. When both the up signal and the down signal are at the high level, both the first switch M1 and the second switch M2 are turned on, and the current flows from A1 to the ground via M1, O, M2 and A2. That is, the capacitor C stops being charged when the down signal is at the high level. Therefore, the voltage value Vc of the capacitor C represents the phase difference between the up signal and the down signal, i.e., The phase difference $\Delta\varphi$ between the electrical signal and the reference signal.

The second analog-to-digital conversion unit determines the number of required delay units according to a relationship between Vc and $\Delta\varphi$, and the phase delayed by each stage of delay unit in the phase compensation module. The following description is given by taking the case that the switch of the delay unit is controlled by outputting signals 0 and 1 as an example. It is assumed that, the signal 0 is used for turning off the switch, and the signal 1 is used for turning on the switch. In a case that the number of required delay units is 20, the second analog-to-digital conversion unit outputs 20 signals 0 and N−20 signals 1 to the phase compensation module, so as to complete the compensation for the inputted electrical signal.

According to an exemplary embodiment of the present disclosure, the photoelectric conversion unit includes at least one pixel, that is, each photoelectric conversion unit may include one pixel or multiple pixels.

According to a third aspect of the present disclosure, a coherent light receiving device is provided, which includes at least one decoherence processing system as described above. For the detail thereof, the implementation of the decoherence processing system provided in the present disclosure may be referred to, which is not repeated herein.

Through the above detailed description, those skilled in the art can easily understand that the decoherence processing method, the decoherence processing system and the coherent light receiving device according to the embodiments of the present disclosure have one or more of the following advantages.

According to some exemplary embodiments of the present disclosure, phases of different photoelectric conversion units/pixels are compensated to a same phase, and multiple electrical signals having the same phase are superimposed, thereby enhancing the signal intensity and eliminating the case that the electrical signal outputted after the superposition is weaker and thus is difficult to be identified, which is caused by the fact that positive and negative signals are canceled due to the different phases.

According to some exemplary embodiments of the present disclosure, in a case that the target detected by the coherent detector is a dynamic target, the phase comparison, the phase compensation, and the superposition and output of the corresponding electrical signals are performed for multiple times, to eliminate the effect of the speed change of the moving object on the phase of the electrical signal converted by the photoelectric conversion unit.

According to some exemplary embodiments of the present disclosure, the total electrical signal outputted each time is used as the reference signal for the next phase comparison, so that an overall phase deviation can be reduced and thus a response speed of phase compensation can be improved with the solution provided in the present disclosure, compared with the solution that the reference signal is set to have a certain fixed phase or a same phase as a certain photoelectric conversion unit.

After considering the specification and practicing the present disclosure disclosed herein, those skilled in the art will easily think of other embodiments of the present disclosure. The present disclosure is intended to cover any variations, uses, or adaptive changes of the present disclosure. These variations, uses, or adaptive changes follow the general principles of the present disclosure and include common knowledge or conventional technical means in the technical field that are not disclosed by the present disclosure. The specification and the embodiments are to be regarded as exemplary only, and the true scope and spirit of the present disclosure are defined by the following claims.

It should be understood that, the present disclosure is not limited to precise structures that have been described above and shown in the drawings, and various modifications and changes can be made without departing from the scope of the present disclosure. The scope of the present disclosure is only defined by the appended claims.

The invention claimed is:

1. A decoherence processing method, applied to a coherent light receiving device, the coherent light receiving device comprising a plurality of photoelectric conversion units, the method comprising:
   comparing, for each of at least two of the plurality of photoelectric conversion units, a phase of an electrical signal converted by the photoelectric conversion unit with a phase of a reference signal to obtain a corresponding phase difference;
   performing, for each of at least two of the plurality of photoelectric conversion units, based on the obtained phase difference, phase compensation on the electrical signal converted by the photoelectric conversion unit, to obtain at least two compensated electrical signals of photoelectric conversion units; and
   superimposing the at least two compensated electrical signals of photoelectric conversion units and outputting an electrical signal obtained by the superposition.

2. The method according to claim 1, wherein the reference signal comprises one of the following:
   a signal having a fixed phase value in a predetermined range;
   one of electrical signals respectively converted by the plurality of photoelectric conversion units, or an electrical signal outputted by superimposing at least two of the electrical signals respectively converted by the plurality of photoelectric conversion units; and
   a total electrical signal outputted by performing phase compensation on at least two of the electrical signals respectively converted by the plurality of photoelectric conversion units and superimposing the compensated electrical signals.

3. The method according to claim 1, wherein the phase comparison, the phase compensation, and the superposition and output of corresponding electrical signals are performed for once or a plurality of times.

4. The method according to claim 3, wherein in a case that the phase comparison, the phase compensation, and the superposition and output of corresponding electrical signals are performed for a plurality of times, the phase of the reference signal is compared with the phase of the electrical signal converted by each of at least two photoelectric conversion units in real time or at a predetermined timing.

5. The method according to claim 4, wherein the electrical signal outputted by superimposing at least two of the electrical signals respectively converted by the plurality of photoelectric conversion units, or the total electrical signal outputted by performing phase compensation on at least two of the electrical signals respectively converted by the plurality of photoelectric conversion units and superimposing the compensated electrical signals is determined as a reference signal for a next phase comparison.

6. The method according to claim 5, wherein the phase compensation is performed by:
   determining the number of required compensation units based on the obtained phase difference between the photoelectric conversion unit and the reference signal, and a preset compensation value of each compensation unit; and
   conducting a corresponding number of compensation units according to the determined number of required compensation units, to compensate the electrical signal converted by the photoelectric conversion unit.

7. The method according to claim 1, wherein the photoelectric conversion unit includes at least one pixel.

8. A decoherence processing system, applied to a coherent light receiving device, wherein the coherent light receiving device comprises a plurality of photoelectric conversion units, and wherein the system comprises: N phase difference detection modules, N phase compensation modules respectively corresponding to the N phase difference detection modules, and a signal superposition and output module, wherein N is an integer greater than 1, wherein
   each of the photoelectric conversion units is configured to receive a light signal and converted the light signal into an electrical signal;
   each of the phase difference detection modules is configured to compare an electrical signal converted by a photoelectric conversion unit connected to the phase difference detection module with a reference signal to obtain a phase difference;
   each of the phase compensation modules is configured to compensate the electrical signal converted by the photoelectric conversion unit connected to the phase compensation module according to the phase difference; and
   the signal superposition and output module is configured to superimpose electrical signals comprising N compensated electrical signals and output an electrical signal obtained by the superposition.

9. The system according to claim 8, wherein the reference signal comprises one of the following:
   a signal having a fixed phase value in a predetermined range;
   one of electrical signals respectively converted by the plurality of photoelectric conversion units, or a total electrical signal outputted by superimposing at least two of the electrical signals respectively converted by the plurality of photoelectric conversion units; and
   a total electrical signal outputted by performing phase compensation on at least two of the electrical signals respectively converted by the plurality of photoelectric conversion units and superimposing the compensated electrical signals.

10. The system according to claim 9, wherein the phase of the reference signal is compared with the phase of the electrical signal converted by each of at least two photoelectric conversion units in real time or at a predetermined timing.

11. The system according to claim 8, further comprising:
    N waveform conversion units, wherein each of the waveform conversion units is provided between one of the photoelectric conversion units and one of the phase difference detection modules corresponding to the waveform conversion unit, and is configured to perform waveform conversion on an electrical signal converted by the photoelectric conversion unit for phase difference detection.

12. The system according to claim 11, further comprising:
    N filtering units, wherein each of the filtering units is provided between one of the waveform conversion units and one of the phase difference detection modules corresponding to the filtering unit, and is configured to convert an electrical signal outputted by the waveform conversion unit into a direct current signal and output the direct current signal to the corresponding phase difference detection module and the corresponding phase compensation module.

13. The system according to claim 8, further comprising:
    N first analog-to-digital conversion modules, wherein each of the first analog-to-digital conversion modules is provided between one of the photoelectric conversion units and one of the phase difference detection modules corresponding to the first analog-to-digital conversion module, and is configured to convert an electrical signal outputted by photoelectric conversion unit into a digital signal for phase difference detection.

14. The system according to claim 8, wherein the phase difference detection module comprises a phase discrimination unit, a phase difference voltage conversion unit and a second analog-to-digital conversion unit that are sequentially connected.

15. The system according to claim 8, wherein the phase compensation module comprises a plurality of series-connected compensation units, each of the compensation units is connected in parallel with a corresponding switch, and the switch is turned on or turned off according to a signal outputted by the phase difference detection module.

16. The system according to claim 8, wherein the photoelectric conversion unit includes at least one pixel.

17. A coherent light receiving device, comprising at least one decoherence processing system according to claim 8.

* * * * *